(12) United States Patent
Nishimura et al.

(10) Patent No.: US 7,530,252 B2
(45) Date of Patent: May 12, 2009

(54) METHOD AND APPARATUS FOR WORKING TUBE

(75) Inventors: Makoto Nishimura, Kanagawa-ken (JP); Masaru Kouyama, Kanagawa-ken (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 645 days.

(21) Appl. No.: 10/620,611

(22) Filed: Jul. 17, 2003

(65) Prior Publication Data

US 2005/0011245 A1  Jan. 20, 2005

(51) Int. Cl.
*B21D 41/04* (2006.01)
*B21D 41/00* (2006.01)
*B21D 11/00* (2006.01)

(52) U.S. Cl. .................. 72/370.13; 72/318; 72/370.02; 72/370.1

(58) Field of Classification Search .................. 72/316, 72/318, 370.01–370.13, 356, 394, 398, 402, 72/367.1, 125, 151, 76, 115, 393; 228/125, 228/151

See application file for complete search history.

(56) References Cited

U.S. PATENT DOCUMENTS

| 3,327,513 | A | * | 6/1967 | Hinshaw | 72/283 |
| 4,722,216 | A | * | 2/1988 | Fencl | 72/402 |
| 6,038,901 | A | * | 3/2000 | Stein et al. | 72/85 |
| 2002/0003849 | A1 | * | 1/2002 | Drillon et al. | 376/260 |

FOREIGN PATENT DOCUMENTS

| JP | 3-68650 | 7/1991 |
| JP | 7-265979 | 10/1995 |

\* cited by examiner

*Primary Examiner*—Dana Ross
*Assistant Examiner*—Teresa Bonk
(74) *Attorney, Agent, or Firm*—Wenderoth, Lind & Ponack, L.L.P.

(57) ABSTRACT

After insertion of a mandrel (23) into a blank tube (20) in the form of an electric welded tube, a parallel swaging operation is carried out by moving a cylindrical die (24) to cause the end of the blank tube (20) to contact tightly with a parallel forming portion (27) of the mandrel (23). After completion of parallel swaging operation, the die (24) is withdrawn out of the blank tube (20) and a push-die (33) is caused to move to the blank tube (20) from a radially outward position while leaving the mandrel (23) inside the blank tube (20) so that a weld bead on the blank tube (20) can be flattened by cooperation with the mandrel (23).

11 Claims, 6 Drawing Sheets

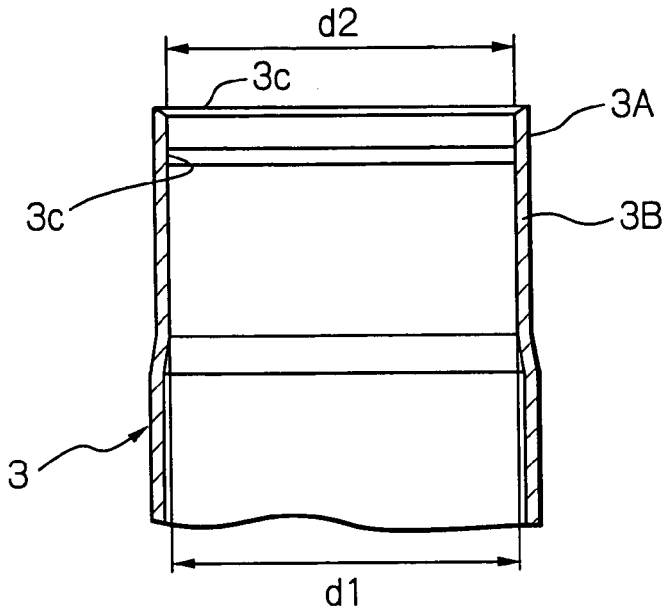
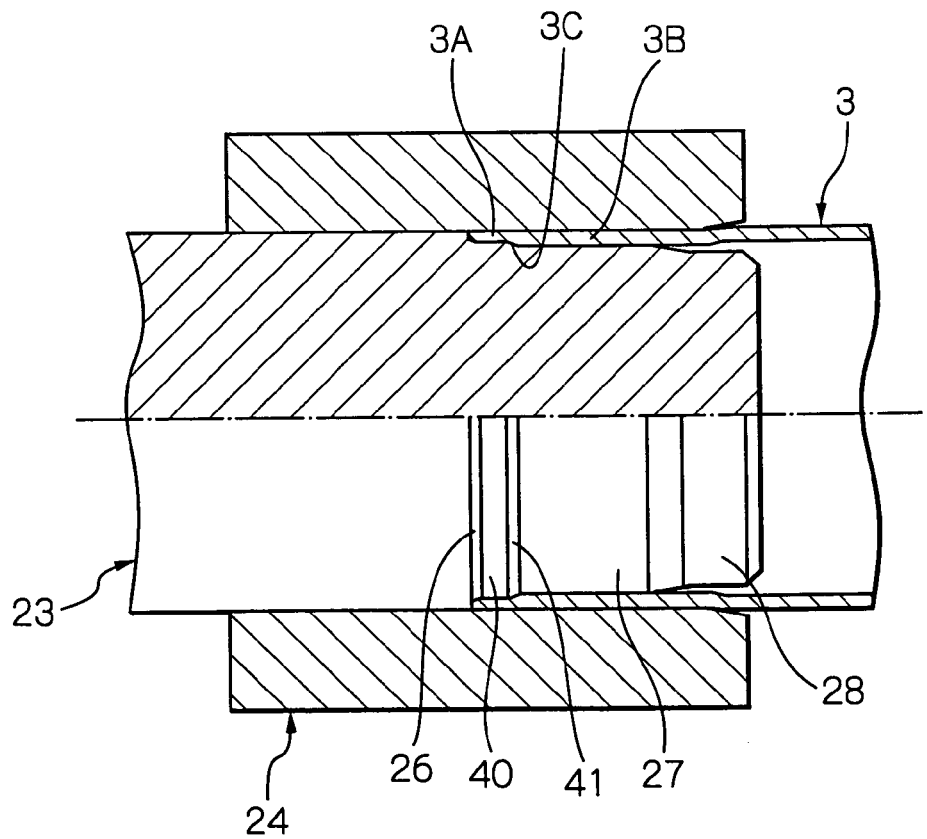

METHOD AND APPARATUS FOR WORKING TUBE

BACKGROUND OF THE INVENTION

1. Field of the Invention

The present invention relates to a working method for forming a tube into a desired shape with predetermined dimensions through a plastic working and a working apparatus suitable for carrying out the method.

2. Description of Related Art

As a typical apparatus that uses a tube, there is a hydraulic shock absorber, and such hydraulic shock absorber is known, for example as shown in FIG. 8 and FIG. 9 wherein it comprises an inner tube 2 accommodated in a bottomed outer tube 3 to receive a piston 1 for sliding, a rod 4 connected at its one end with the piston 1 and extended outwardly at its opposite end passing through a rod guide 5 engaged jointly with the opened ends of the inner and outer tubes 2 and 3, piston valves 7 provided on the piston 1, and a base valve 8 provided at the inner bottom of the outer tube 3. These piston and base valves serve to create damping forces during strokes of the piston-rod in extension and compression directions, allowing hydraulic fluid filled in the inner tube 2 to pass through these valves. The volume of the hydraulic fluid corresponding to advancement or retraction of the piston rod 4 may be compensated for by means of a reservoir 9 in which gas and hydraulic fluid are filled between inner and outer tubes 2 and 3.

In this type of hydraulic shock absorber, a rod guide 5 and an oil seal 6 are press-fitted on the outer tube 3 at its opened end. Then, the rod guide 5 and the oil seal 6 are adapted to resist their withdrawal by means of a bent piece 10 which has been formed by bending this portion inwardly over the entire circumference of the opened end of the outer tube 3 or partially bent at a plural points in the circumferential direction. (see Japanese Unexamined Utility Model Application Publication No. HEI. 3-68650). A cap 11 that receives a bump rubber (not shown) is usually press-fitted on the end of the outer tube and fixed in position. The cap 11 is positioned in place by allowing a predetermined number (e.g., three) of protrusions arranged at the inner bottom side of the cap 11 so as to abut against the bent piece 10. In the meantime, there are also arranged an eye 12 serving as a mounting point at a vehicle side, a mounting member 13 serving as a mounting point at an axle side, and a spring receiver 14 for receiving a coil spring.

Because the opened end of the outer tube 3, which forms a part of the aforementioned hydraulic shock absorber, is formed such that its inner diameter surface is used as an engagement portion with the rod guide, and its outer diameter surface is used as a press-fitting section of the cap 11, a high degree of precision is required not only in working the inner and outer diameter surfaces, but also in assuring concentricity and circularity. Additionally, since the inner surface of the opened end of the outer tube 3 is also provided as an engagement portion with an oil seal 6 as previously described, an excellent surface smoothness must be ensured in installing the oil seal 6 so as not to impair the oil seal. Therefore, it has been a conventional practice to ensure a predetermined precision in dimensions, and shape and surface smoothness by machining or turning the tube end, using an electrically welded tube such as an electrically sewn-welded tube etc., as a blank tube.

Some attempts therefore have also been made to squeeze an end of the electric welded tube (blank tube) through a swaging process (rotary swaging process) for ensuring predetermined dimensions and shape (see, for example, the Japanese Unexamined Patent Application Publication No. HEI. 7-265979).

However, in the conventional approach of working the tube end through a machining operation which requires precise working of the tube, there is a problem that the machining operation itself involves an increased number of steps and extended working time which unavoidably create increased working costs. There also arises another problem in that cutting chips and burrs that may be produced during a machining operation may adhere to the tube's inner surface, and ingress into the hydraulic shock absorber as foreign materials (as contaminant).

Moreover, in the method for swaging the end of an electric welded tube, weld beads (welds) may remain on the electric welded tube, requiring a finishing working to be made by a turning operation, and thus it is far from proving a radical solution. In the meantime, the invention as described in the Japanese Patent Unexamined Application Publication No. HEI7-265979 contemplates an approach by which a female thread is formed on the inner surface of the tube end after the swaging operation is performed, and thus when such a post-working process is applied, it does not matter if there is a residue of beads. If a seamless tube is used as the blank tube as previously described, the need for applying a finishing operation may be eliminated, but in this case, an expensive seamless tube, unavoidably results in increased cost.

SUMMARY OF THE INVENTION

The present invention has been made with the aforementioned problem as a background, and its object is to provide a method for working a tube in such a way that it ensures excellent precision in dimensions and shape as well as surface smoothness, and thereby allows the method to greatly contribute to saving of cost and improved productivity, even when an inexpensive welded tube is used and a simple parallel swaging operation is applied. A further object is to provide an optimum working apparatus for use in carrying out the working method.

To solve the aforementioned problem, the method of the present invention comprises the steps of inserting a mandrel into a blank tube made of a welded tube, applying a parallel swaging operation by means of a die so as to cause the blank tube to contact tightly to the mandrel, then drawing the die out of the blank tube, moving a push die to the blank tube from a radially outward position while keeping the mandrel in the blank tube, and causing the weld of the blank tube to be flattened by cooperation with the mandrel.

In such a method for working the tube, excellent precision in dimensions and shape as well as surface smoothness may be ensured by squeezing the blank tube through a parallel swaging operation and by causing the inner surface of the tube to tightly contact the mandrel. Besides, since the weld on the welded tube is eventually caused to be flattened through a cooperative action between the push die and the mandrel, the need of applying a cumbersome finishing working through a turning operation may be eliminated.

In the method of the present invention, a parallel swaging operation is desirably performed by means of a die, after insertion of the mandrel into the blank tube. By first inserting the mandrel into the blank tube in this way, no rubbing action may occur between the blank tube and the mandrel during a parallel swaging operation, and thus the inner surface of the tube is not damaged. In this case, the blank tube may be tapered at the inner edge of the tip, by utilizing cooperative action between the mandrel and the die. Moreover, the blank tube may alternatively be formed with a reduced thickness section at its tip end, which is used as a radial inwardly bent piece by a cooperative action between the mandrel and the die.

Besides, in the method of the present invention, the cylindrical die may alternatively be formed with a relief portion at its inner circumference, which has a slightly enlarged inner diameter and is used as a reservoir for lubricating oil.

To solve the aforementioned problem, the tube working apparatus is characterized in that it comprises a push-die arranged on a swage working apparatus. The push-die is adapted to move toward and away from the blank tube from a radially outward position. The swage working apparatus comprises a clamp for supporting the blank tube, a mandrel which may be inserted into the blank tube supported by the clamp, and a die adapted to translate along the blank tube supported by means of the clamp.

In the present working apparatus, the mandrel may alternatively be formed with a forming surface that serves to form the tip end of the blank tube so as to have a thickness that is less than a predetermined tube wall thickness.

BRIEF DESCRIPTION OF THE DRAWINGS

FIG. 6 is a sectional view showing a desirable end shape of the outer tube, i.e., the work piece of the present invention;

FIG. 7 is a sectional view showing the construction of mandrel and die for use in working the outer tube, as shown in FIG. 6;

DETAILED DESCRIPTION OF THE INVENTION

Figure 1:
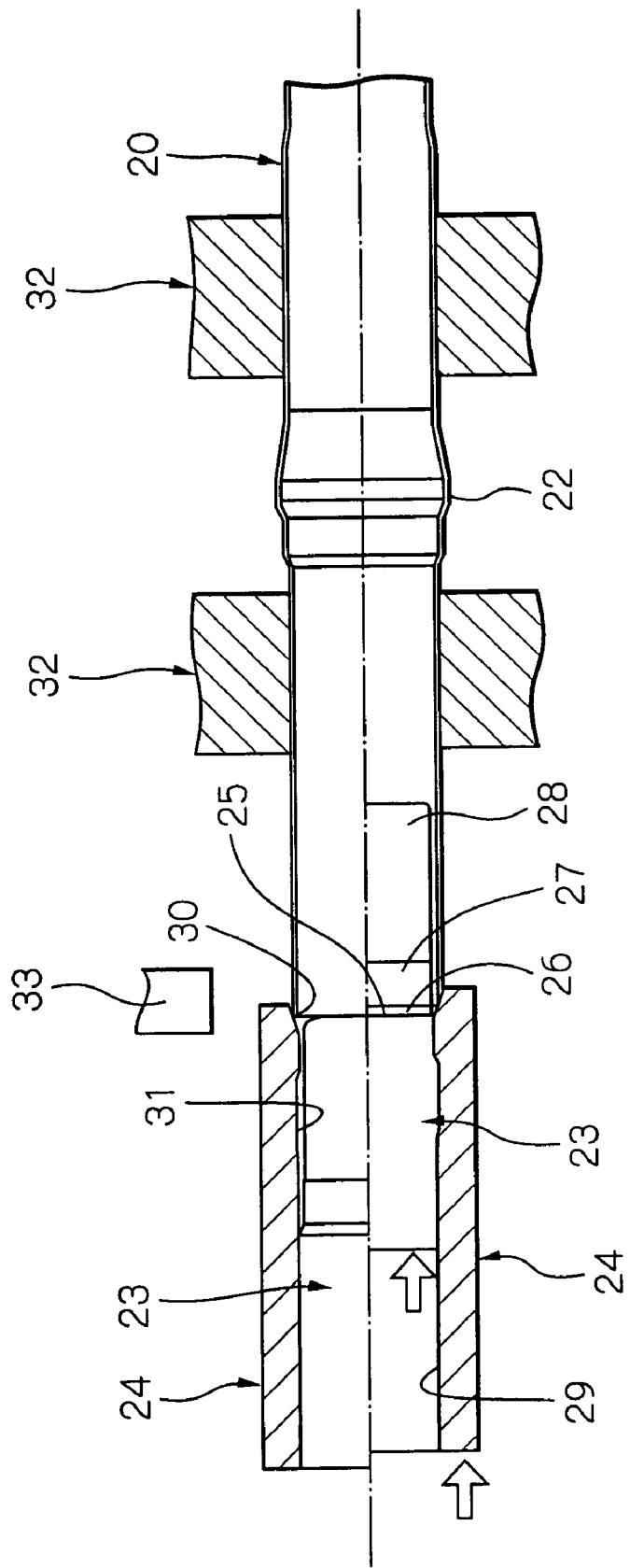
FIG. 1 is a sectional view showing a step for commencing a method for working a tube in accordance with the present invention.
Figure 2:
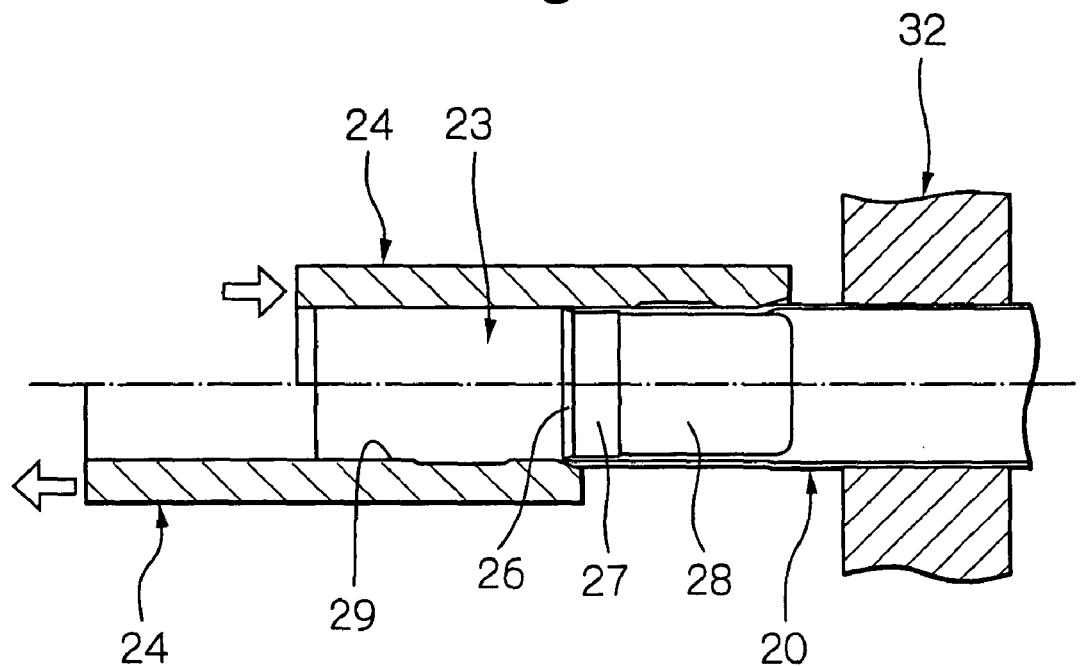
FIG. 2 is a view showing an intermediate step in the method for working the tube according to the invention.
Figure 3:
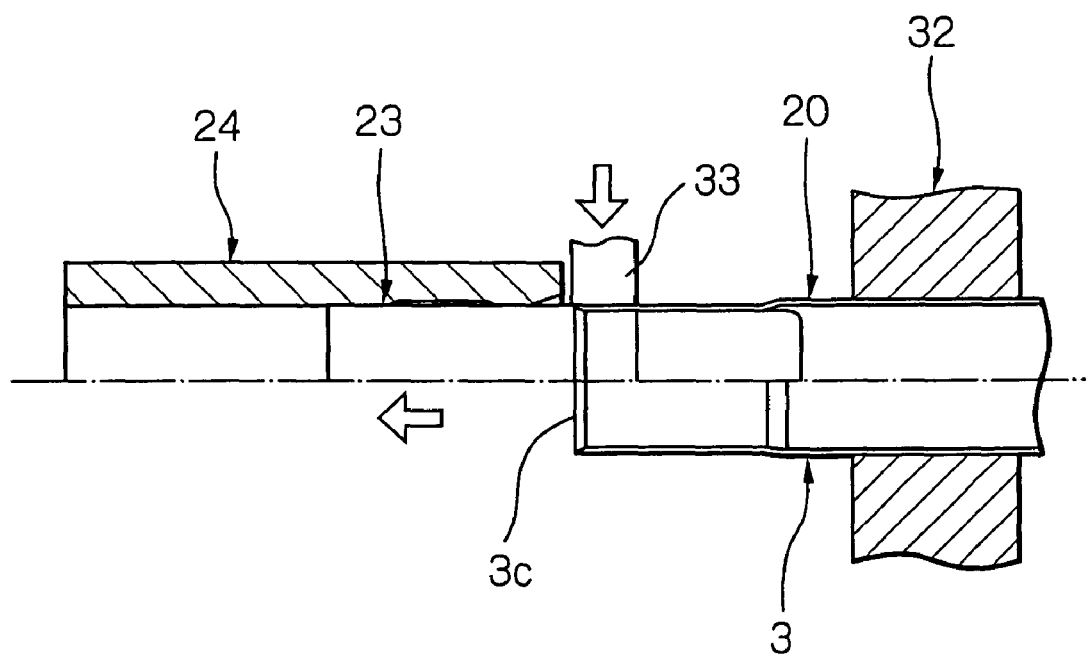
FIG. 3 is a view showing a final step in the method for working the tube according to the invention.
Figure 5:
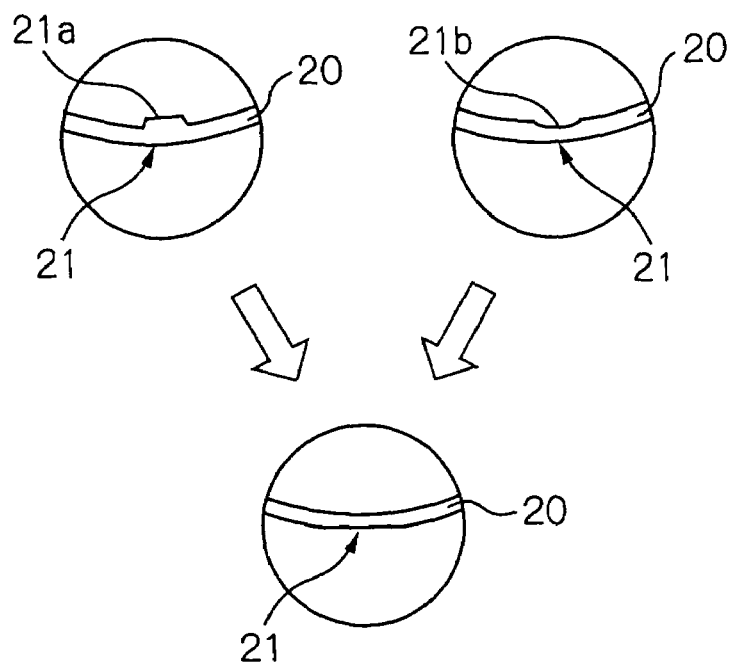
FIG. 5 is a schematic view showing weld beads before being worked and after being worked.
Figure 8:
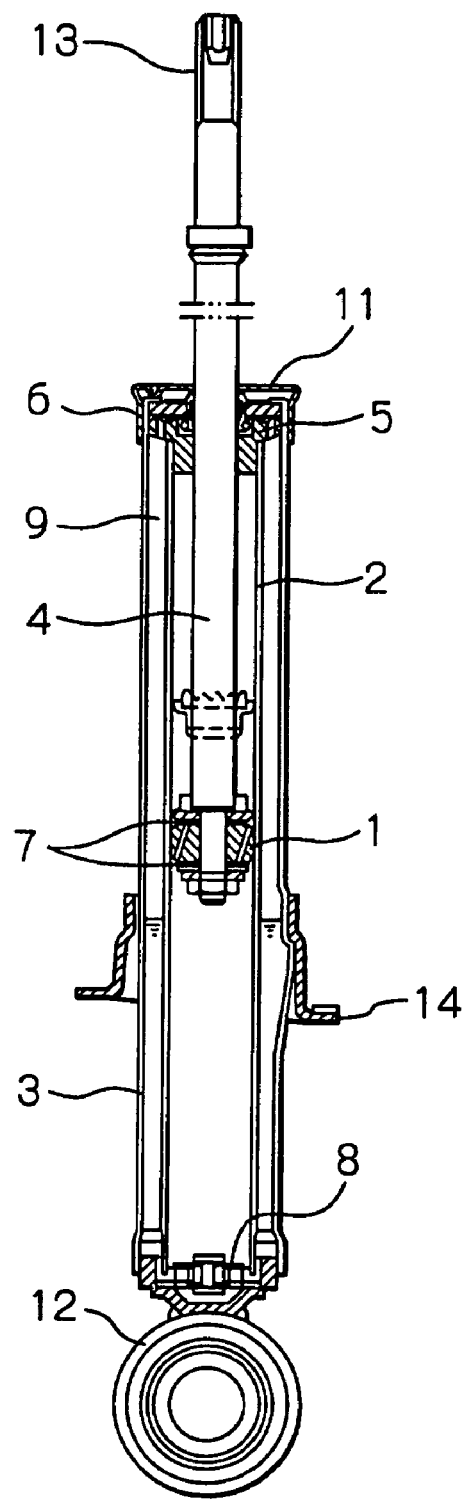
FIG. 8 is a sectional view showing the entire construction of a hydraulic shock absorber having the outer tube which is a work piece of the present invention.

FIG. 1 to FIG. 3 illustrate a method for working a tube end in a sequential order to show an embodiment of the present invention. The present embodiment contemplates forming the end of the outer tube 3 of the hydraulic shock absorber shown in FIG. 8 and FIG. 9 into predetermined dimension and shape through plastic working. An electric resistance-welded tube (electric welded tube) is used herein as a blank tube 20. An electric welded tube is formed by continuously shaping a band steel into a tubular shape by mean of forming rolls, and by causing the joint sections to abut against each other while applying resistance heating, as is well-known to those skilled in art. The tube wall is formed with weld beads 21, as shown in FIG. 5. However, during a production process of an electric welded tube, a bead cutting operation is usually performed within the production line, and thus the weld bead 21 is made to be flat at the outer surface of the blank tube 20, as shown in FIG. 5. In this case, a weld bead 21 remaining on the inner surface of the blank tube 20 takes such a configuration as either a convex bead 21a or a concaved bead 21b, depending on blank material characteristics and welding parameters as shown in the same drawing. In the meantime, a bulged portion 22 has been formed in a middle portion of the blank tube 20 through a pre-bulging process, as shown in FIG. 1, and this bulged portion 22 is used as a support for attaching a spring receiver 14 (FIG. 8)

Figure 4:
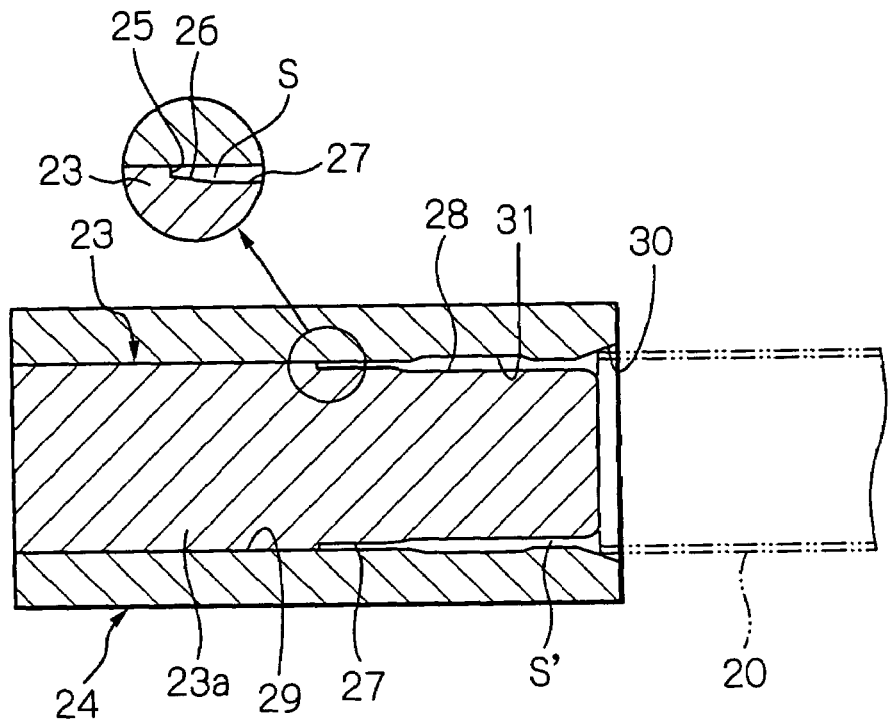
FIG. 4 is a sectional view showing the structure of mandrel and die of the present invention.
Figure 9:
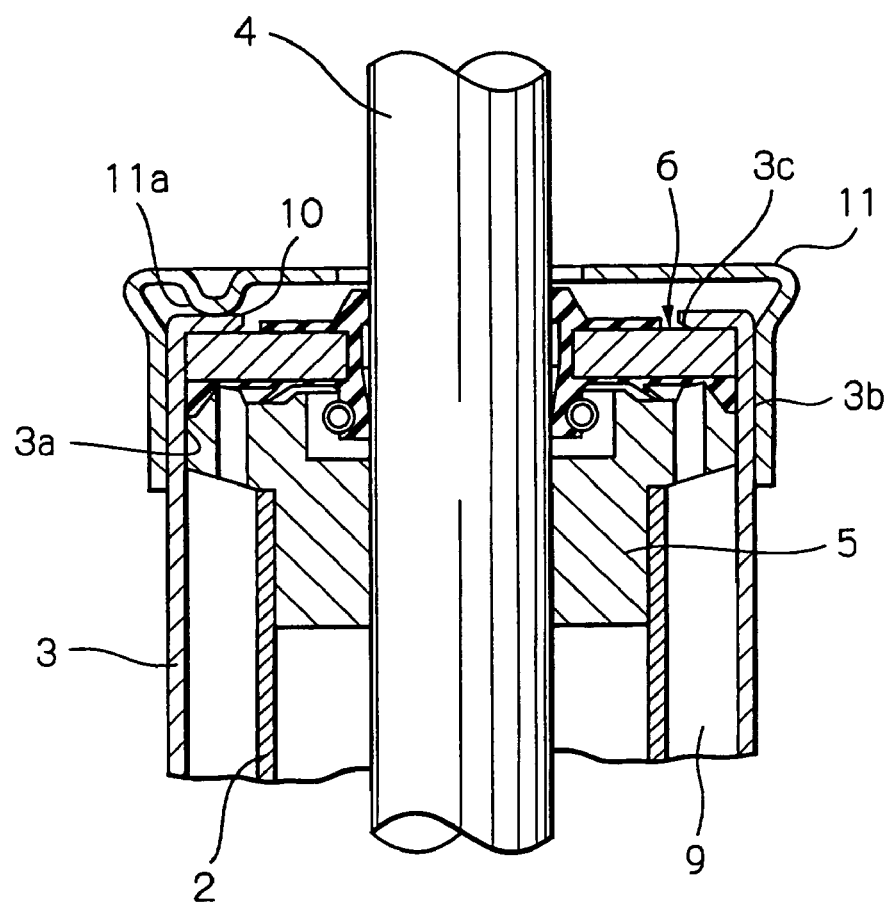
FIG. 9 is a sectional view showing essential elements of the hydraulic shock absorber as shown in FIG. 8.

The present embodiment is characterized in that a parallel swaging operation is applied to the end of the blank tube. For achieving this operation, a mandrel 23 which is inserted into the blank tube 20 and a cylindrical die 24 which fits on the mandrel are prepared. The mandrel 23 comprises a taper forming portion 26 of a small width contiguous to a body section 23a of the mandrel 23 via a stepped surface 25, a parallel forming portion 27 contiguous to the taper forming portion 26, and a relief portion 28 contiguous to the parallel forming portion 27 with a reduced diameter slightly less than the parallel forming portion 27. The parallel forming portion 27 has dimension and shape such that it matches the inner end surface 3a of the outer tube 3 with which the rod guide 5 and oil seal 6 engage (FIG. 9), and the taper forming portion 26 has a dimension and shape such that it matches a tapered surface 3c that is needed at the inner edge of the opened end of the outer tube (FIG. 7). On the other hand, the die 24 has a cylindrical inner surface 29 which matches the outer surface 3b of the outer tube 3 onto which the cap 11 is press-fitted (FIG. 9). Consequently, a clearance S is formed between the cylindrical inner surface 29 of the die 24 and the parallel forming portion 27 of the mandrel 23 so as to have a value substantially equal to the thickness of the blank tube 20. A clearance S' is formed having a value greater than the wall thickness of the blank tube 20 between the cylindrical inner surface 29 of the die 24 and the relief portion 28 of the mandrel 23, (FIG. 4). In the meantime, the die 24 is provided at its open end with a tapered inlet portion 30 for insertion of the blank tube 20 into the die 24, and at an inner portion from the opened end of the die 24 with a relief portion 31 which is enlarged in diameter relative to the cylindrical inner surface 29.

In embodying the present embodiment, the blank tube 20 is supported by means of clamps 32 of a swaging machine (parallel swaging machine), and the mandrel 23 is supported by means of cushion cylinder (not shown) arranged in the swaging machine, whereas the die 24 is supported by means of a movable part (not shown) in the swaging machine. The swaging machine is provided with a push-die 33 which can move from a radially outer position toward and away from the blank tube 20 supported in position by means of clamps 32. The push-die 33 serves to cause a weld bead 21 (FIG. 5) on the blank tube 20 to be flattened in cooperation with the mandrel, after the aforementioned swaging operation is achieved, and so it is supported by means of a cylinder (not shown). Meanwhile, the effective end face of the push-die 33 may have a flat shape, or alternatively a curved shape that conforms to the outer shape of the blank tube 20 after the swaging operation as described later.

The method for working the end of the tube in accordance with the present invention will be described in details below with reference to accompanying drawings FIG. 1-FIG. 3.

In working the tube end, the blank tube 20 is supported by means of the clamps 32 in the swaging machine, as shown in FIG. 1. More particularly, the blank tube is supported on a rotary mechanism (not shown) which is associated with the swaging machine, and a servo-motor of the rotary mechanism is controlled before the aforementioned clamps 32 support the blank tube, to orient the blank tube 20 so that the weld bead 21 is precisely positioned in a stroke of the push-die 33. Meanwhile, control of the aforementioned rotary mechanism may be made in such a method that a position of the weld bead 21 is detected by means of, for example, a reflective laser sensor to roughly position the blank tube based on this detecting signal, and then precise positioning is achieved through image processing and pattern matching.

After the aforementioned preparation is completed, the mandrel 23 and the die 24 are caused to advance in unison, as shown in the right half of FIG. 1. The die 24 ceases advancement in the position where the end of the blank tube abuts against the tapered tip inlet 30 of the die. On the other hand, the mandrel 23 is inserted into the blank tube 20 until the end of the blank tube abuts against its stepped surface 25, and is then fixed in this position. Then, the die 24 is advanced slightly after the position of the mandrel 23 is fixed. Consequently, the tip end of the blank tube 20 is squeezed along the tapered inlet portion 30 of the die 24, and simultaneously the inner edge of its tip end is urged against the taper forming portion 26 of the mandrel 23, thereby forming a tapered surface at its tip end of the blank tube which corresponds to the tapered surface 3c of the outer tube 3 (see FIG. 3).

Subsequently, the mandrel 23 is released from its fixed position, and placed in a condition that a cushioning pressure from the cushion cylinder is applied to the mandrel. The die 24 is then advanced as shown in the upper half of FIG. 2. The advancement of the die 24 causes the end of blank tube 20 to be progressively squeezed in a so-called parallel swaging operation, and the mandrel 23 is made to gradually retract to compensate for the elongation of the blank tube 20 while the parallel swaging operation proceeds. At this instance, the tip side of the blank tube following the tapered surface 3c is urged against the parallel forming portion 27 on the mandrel by the effect of the die 24, and the inner surface of the blank 20 is brought into intimate contact with the parallel forming portion 27. In this way, the tip end of the blank tube 20 is provided with an inner diameter as needed to provide an inner surface 3a of the outer tube 3 with which the rod guide 5 and oil seal 6 engage, and an outer diameter as needed to provide an outer surface 3b of the outer tube 3 onto which the cap 10 is pressure-fitted, while simultaneously ensuring necessary concentricity and circularity.

On the other hand, since the tip side beyond the parallel forming portion is formed as a relief portion 28 with a diameter slightly smaller than the parallel forming portion 27 of the mandrel 23, the inner surface of the blank tube 20 does not tightly contact with the mandrel 23 in this area, and a process of squeezing of the tube by means of the die 24 only is performed. Because the die 24 is provided with a recessed relief portion 31 on its cylindrical inner surface 29, a length of the forming portion (bearing portion) of the die 24 which contributes to the squeezing operation of the blank tube is substantially shortened, thereby reducing a working pressure requirement in the squeezing operation and suppressing a scraping action. Especially in the embodiment of the present invention, the recessed relief portion 31 of the die 24 may be supplied with a lubrication oil by, for example, applying a pressure to the oil, so as to store the lubrication oil beforehand. In this arrangement, the working pressure is further reduced, and any scraping action can be prevented more reliably.

In the meantime, it may occur that blank tubes have welded beads which are not uniform in their circumferential width for the reason of various factors encountered during their manufacture. To cope with such variation in the welded bead of the blank tube, the blank tube is preferably angularly shifted by a predetermined angle (e.g. 10°) in both normal and reverse directions from the predetermined position of the bead, by means of the rotary mechanism of the swaging machine and the push die 33 is arranged to press the bead portion on the blank tube in each of the rotationally shifted positions. When the push die 33 is adapted to press the bead on the blank tube in the shifted positions of the tube, a smooth finish of the inner surface of the blank tube 20 can be ensured, despite the variation in the weld bead on the blank tube.

The parallel swage working is thus completed, and then the die 24 only is actuated to retract, while leaving the mandrel 23 inside the blank tube 20, as shown in the lower half of FIG. 2. Then, simultaneously with the drawing of the die 24 from the blank tube 20, the push-die 33 is caused to move closer to the blank tube 20 from a radially outward position. Consequently, the weld bead 21 on the blank tube 20 is compressed by means of the push-die 33 against the parallel forming portion 27 of the mandrel 23. In this way, the weld bead portion 21 (protruding bead 21a or recessed bead 21b) is flattened so as to ensure a smooth finish of the inner surface of the blank tube 20, as shown in FIG. 5.

Thereafter, the mandrel 23 is retracted, as shown in the lower half of FIG. 3, and withdrawn out of the blank tube 20, while actuating the push-die 33 to retract to an original standby position, to complete a series of working operations for the tube end.

In this way, the outer tube of the hydraulic shock absorber (FIG. 8 and FIG. 9) is completed, and because the completed outer tube 3 has been finished such that its opened end has a predetermined dimension and shape and a desired inner surface roughness, the rod guide 5 and oil seal 6 may be fitted to the open end smoothly, while ensuring a smooth press-fitting of the cap 10. Since a tapered surface 3c is formed at the inner edge of the opened end, the need of a step for making a chamfer for facilitating insertion and assembly of the oil seal 6 may be eliminated.

Although this type of hydraulic shock-absorber is designed to prevent the rod guide 5 and the oil seal 6 from being removed, by utilizing a bent piece 1 which is formed by bending the open end of the outer tube 3 inwardly along the entire circumference or partially at plural points in the circumferential direction (FIG. 9), as previously described, it has been a rather difficult operation to form a bent piece 10, because, partly, of its short length that is subjected to working. The inventors, have been seriously engaged in the study for a possible solution in respect of forming this bent piece 10, and found that an extremely advantageous result may be achieved by providing a reduced wall thickness portion 3A having a thickness less than the prescribed tube wall thickness at the tip end of the outer tube 3 in conducting the working process of bending smoothly.

The embodiment to be described hereinbelow has been made based on the aforementioned finding, wherein a second-parallel forming portion 40 is provided, as shown in FIG. 7, in a position corresponding to that between the taper forming portion 26 and the parallel forming portion 27 of the mandrel 23 used in the above embodiment (FIG. 1-FIG. 3) so that he second parallel forming portion 40 has a diameter slightly larger than that of the parallel forming portion 27, and the second parallel forming portion 40 and the parallel forming portion 27 are joined together with a taper forming portion 41 therebetween.

Using the aforementioned mandrel 23 enables the end of blank tube 20 to be urged against the second parallel forming portion 40, the taper forming portion 41 and the parallel forming portion 27, upon the start of the parallel swaging operation as shown in the upper half of FIG. 2. As a result, the worked end of the outer tube 3 is formed such that it comprises the reduced wall thickness portion 3A placed on the outer side (tube end side) of the engagement portion 3B having the predetermined inner diameter d1 needed for engagement by the rod guide 5 and the oil seal 6, as shown in FIG. 6. The reduced wall thickness portion 3A has an inner diameter d2 slightly larger than the inner diameter d1 (d2>d1), and further comprises a step 3C between the reduced wall thickness portion 3A and the engagement portion 3B.

The outer tube 3 which is obtained as previously described allows its reduced wall thickness portion 3A to be bent very easily inwardly utilizing the step 3C as a pivot point when the aforementioned bent piece 10 (FIG. 9) for preventing withdrawal is to be bent by a press machine. Thus the bent piece 10 can be formed in a simple and precise manner.

If a bent piece 10 is to be formed to have a plurality of inwardly bent sections along the circumference, what is needed is merely to give a reduced thickness to these sections. In this case, the second parallel forming portion 40 and the taper forming portion 41 to be provided on the mandrel 23 as described previously are formed interruptedly in the circumferential direction.

Meanwhile, although a cylindrical die is used as the die 24 in each of the aforementioned embodiments, a ring-shaped die may alternatively be used. If such a ring-shaped die is used, the need of the recessed relief portion 31 (FIG. 4) used as an oil reservoir can be eliminated.

It is naturally possible that electric welded tubes such as TIG welded tubes and MIG welded tubes, plasma-welded tubes and the like can be alternatively be used in the present invention in place of the aforementioned electrically sewn-welded tube.

As aforementioned in details, in accordance with the method and the device for working a tube, excellent surface dimension and shape precision as well as desired surface smoothness are ensured, even if inexpensive welded tubes and simple parallel swaging process are used, thereby achieving cost-reduction and improved productivity. Besides, since there is no risk of any foreign material to be entrapped as otherwise often observed during a machining operation, it may be an optimum approach for working cylindrical articles of hydraulic devices such as cylinder devices etc., Moreover, in the method of the present invention, if it is arranged such that a parallel swaging operation is performed by means of a die, after insertion of a mandrel into a blank tube, there is no chance of rubbing action between the blank tube and the mandrel during the parallel swaging operation, and therefore, no damage of the inner surface of the tube may occur. This fact further improves the surface smoothness. At this moment, a subsequent chamfering operation may be omitted when a tapered surface is formed at the inner edge of the tip of the blank tube by a cooperative action between the mandrel and the die. Further if a reduced wall thickness portion is formed at the tip of the blank tube that may be used as a bent piece extending in a radially inward direction by a cooperative action between the mandrel and the die, bending working of the bent piece may be performed easily.

Furthermore, in a case where a relief portion with a slightly enlarged inner diameter is provided around the inner circumference of the tubular die, and such relief portion is used as a reservoir of lubricating oil, such arrangement may contribute significantly to a lower forming pressure and elimination of scraping action.

What is claimed is:
1. A method for working a tube comprising:
 inserting a mandrel into a blank tube in a form of a welded tube:
 applying a parallel swaging operation by translating a cylindrical die axially along and relative to the blank tube and the mandrel so as to cause the blank tube to contact tightly with the mandrel;
 subsequently withdrawing the cylindrical die from the blank tube, while keeping the mandrel in the blank tube; and
 moving a push-die to the blank tube from a radially outward position to flatten a weld portion on the blank tube in cooperation with the mandrel, wherein the push-die is moved to the blank tube after the cylindrical die is withdrawn from the blank tube and while the mandrel is in the blank tube.

2. A method for working a tube in accordance with claim 1, wherein a tapered surface is formed at an inner edge of a tip end of the blank tube through a cooperative action between the mandrel and the cylindrical die.

3. A method of working a tube in accordance with claim 2, wherein a reduced thickness portion is formed at the tip end of the blank tube through a cooperative action between the mandrel and the cylindrical die so that the reduced thickness portion can be used as a bent piece extending in a radially inward direction.

4. A method for working a tube in accordance with claim 3, wherein the cylindrical die comprises a tapered inlet portion and a relief portion formed in an inner surface of the cylindrical die, the relief portion being spaced from the tapered inlet portion of the cylindrical die to extend circumferentially, and the relief portion has a slightly enlarged inner diameter and is used as a reservoir for lubricating oil.

5. A method for working a tube in accordance with claim 2, wherein the cylindrical die comprises a tapered inlet portion and a relief portion formed in an inner surface of the cylindrical die, the relief portion being spaced from the tapered inlet portion of the cylindrical die to extend circumferentially, and the relief portion has a slightly enlarged inner diameter and is used as a reservoir for lubricating oil.

6. A method for working a tube in accordance with claim 1, wherein a reduced thickness portion is formed at a tip end of the blank tube through a cooperative action between the mandrel and the cylindrical die, so that the reduced thickness portion can be used as a bent piece extending in a radially inward direction.

7. A method for working a tube in accordance with claim 6, wherein the cylindrical die comprises a tapered inlet portion and a relief portion formed in an inner surface of the cylindrical die, the relief portion being spaced from the tapered inlet portion of the cylindrical die to extend circumferentially, and the relief portion has a slightly enlarged inner diameter and is used as a reservoir for lubricating oil.

8. A method for working a tube in accordance with claim 1, wherein the cylindrical die comprises a tapered inlet portion and a relief portion formed in an inner surface of the cylindrical die, the relief portion spaced from the tapered inlet portion of the cylindrical die to extend circumferentially, and the relief portion has a slightly enlarged inner diameter and is used as a reservoir for lubricating oil.

9. An apparatus for working a welded tube having a weld bead, said apparatus comprising: a parallel swaging machine and a push-die, said parallel swaging machine including a clamp for supporting the welded tube, a rotary mechanism associated with the said parallel swaging machine, means for controlling said rotary mechanism to orient the welded tube so that the weld bead is positioned in a stroke of said push-die, a mandrel insertable into the welded tube when supported on said clamp, and a cylindrical die that translates along the welded tube when supported on said clamp, said push-die being mounted on said parallel swaging machine so that it moves toward the welded tube from a radially outward position and away from the welded tube.

10. An apparatus for working a tube in accordance with claim 9, wherein a forming surface is provided on said mandrel for forming a tip end of the blank tube to have a thickness that is less than an adjacent wall portion of the blank tube.

11. A method for working a tube comprising:

inserting a mandrel into a blank tube in a form of a welded tube having a weld bead;

orienting the blank tube so that the weld bead is positioned in a stroke of a push-die;

applying a parallel swaging operation by translating a cylindrical die axially along and relative to the blank tube and the mandrel so as to cause the blank tube to contact tightly with the mandrel;

subsequently withdrawing the cylindrical die from the blank tube; and moving the push-die to the blank tube from a radially outward position to flatten a weld portion on the blank tube.

* * * * *